(12) United States Patent
Knoener et al.

(10) Patent No.: US 11,717,905 B2
(45) Date of Patent: *Aug. 8, 2023

(54) METHODS AND APPARATUS TO COMMUNICATE VIA A WELDING ARC

(71) Applicant: Illinois Tool Works Inc., Glenview, IL (US)

(72) Inventors: Craig Steven Knoener, Appleton, WI (US); Milad Pashapour Nikou, Appleton, WI (US); Andrew James Thielke, Kaukauna, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 702 days.

This patent is subject to a terminal disclaimer.

(21) Appl. No.: 16/827,303

(22) Filed: Mar. 23, 2020

(65) Prior Publication Data

US 2020/0215637 A1 Jul. 9, 2020

Related U.S. Application Data

(63) Continuation of application No. 15/647,620, filed on Jul. 12, 2017, now Pat. No. 10,596,651.

(51) Int. Cl.
*B23K 9/095* (2006.01)
*H05H 1/48* (2006.01)
(Continued)

(52) U.S. Cl.
CPC .......... *B23K 9/0956* (2013.01); *B23K 9/1006* (2013.01); *B23K 9/1062* (2013.01);
(Continued)

(58) Field of Classification Search
CPC .. B23K 9/0956; B23K 9/1006; B23K 9/1062; H04R 23/004; H05H 1/048; H05H 1/48
See application file for complete search history.

(56) References Cited

U.S. PATENT DOCUMENTS 4,471,207 A 9/1984 Hawkes
4,641,292 A 2/1987 Tunnell
(Continued)

FOREIGN PATENT DOCUMENTS

CN 202218397 5/2012
CN 104980843 A * 10/2015 ............. G06F 3/162

OTHER PUBLICATIONS

Machine translation of CN 104980843 A, Dec. 2022 (Year: 2022).*
(Continued)

*Primary Examiner* — Geoffrey S Evans
(74) *Attorney, Agent, or Firm* — McAndrews, Held & Malloy, Ltd.

(57) ABSTRACT

Methods and apparatus to communicate via a welding arc are disclosed. An example welding-type power supply includes a power converter, a weld monitor, and an arc modulator. The power converter outputs welding power to sustain a welding-type arc at a welding-type torch. The weld monitor monitors one or more aspects of a weld performed using the welding-type arc and the welding-type torch, and selects an audio message based on the one or more aspects. The arc modulator configured to modify the welding-type arc to output the selected audio message as a plasma speaker.

17 Claims, 3 Drawing Sheets

(51) Int. Cl.
 B23K 9/10 (2006.01)
 H04R 23/00 (2006.01)
 B23K 10/00 (2006.01)

(52) U.S. Cl.
 CPC ........... *B23K 10/00* (2013.01); *H04R 23/004* (2013.01); *H05H 1/48* (2013.01)

(56) References Cited

U.S. PATENT DOCUMENTS

| | | | |
|---|---|---|---|
| 4,677,277 | A | 6/1987 | Cook |
| 4,996,409 | A | 2/1991 | Paton |
| 5,086,207 | A | 2/1992 | Deam |
| 5,138,132 | A | 8/1992 | Baeurle |
| 5,220,246 | A | 6/1993 | Ide |
| 7,705,269 | B2 | 4/2010 | Daniel |
| 10,596,651 | B2 * | 3/2020 | Knoener ................ B23K 10/00 |
| 2003/0164359 | A1 | 9/2003 | Norris |
| 2007/0164006 | A1 | 7/2007 | Burgstaller |
| 2013/0208569 | A1 | 8/2013 | Pfeifer |
| 2014/0144897 | A1 | 5/2014 | Stava |
| 2014/0263242 | A1 | 9/2014 | Peters |
| 2016/0175976 | A1 | 6/2016 | Denis et al. |
| 2016/0207134 | A1 | 7/2016 | Beeson |

OTHER PUBLICATIONS

"The Art of Speaker Design", http://www.nutshellhifi.com/library/speaker-design1.html, Text © Lynn Olson 2002. (14 pgs.).

Hopkins, M. & Houlahan, T., "The Plasma Speaker: Construction andCharacterization of Both Full-bridge and Single-ended Driving Circuits", May 11, 2012 (14 pgs.).

Int'l Search Report and Written Opinion Appln No. PCT/US2018/040713 dated Jan. 14, 2019 (13 pgs.).

Kis, J. "Singing Arc" A Senior Project presented to the Faculty of the Electrical Engineering Dept., California Polytechnic State Univ. San Luis Obispo, Mar. 2014 (29 pgs.).

Severinsen, D & Gupta, G.S., Senior Member, IEEE, "Design and Evaluation of Electronic Circuit for Plasma Speaker" Proceedings of the World Congresson Engineering 2013 vol. II, WCE 2013, Jul. 3, 2013, London, U.K. pp. 1111-1116 (6 pgs.).

* cited by examiner

METHODS AND APPARATUS TO COMMUNICATE VIA A WELDING ARC

CLAIM OF PRIORITY

This patent application is a continuation of U.S. patent application Ser. No. 15/647,620, filed on Jul. 12, 2017, now issued U.S. Pat. No. 10,596,651. The above identified application is hereby incorporated herein by reference in its entirety.

BACKGROUND

This disclosure relates generally to welding systems and, more particularly, to methods and apparatus to communicate via a welding arc. Conventional welding and cutting systems provide feedback to the welding operator using conventional output devices such as analog meters, light emitting diode (LED) indicators, 7-segment LED displays, liquid crystal displays, and/or the like, located on a panel of a welder or wire feeder. Conventional welding systems may provide feedback to the operator before, during, and/or after welding, but providing effective feedback to an operator during welding has traditionally been the most difficult.

SUMMARY

Methods and apparatus to communicate via a welding arc are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
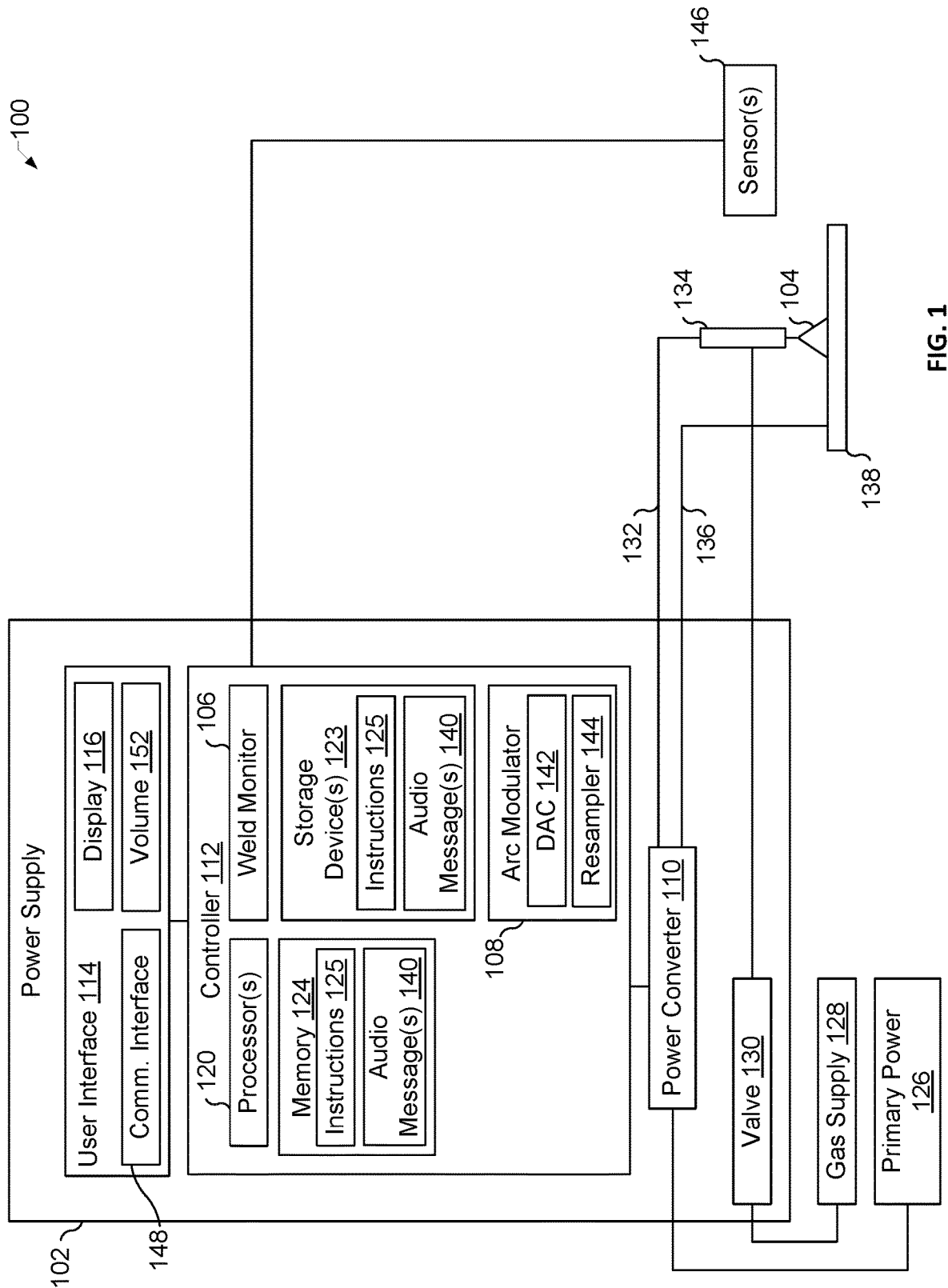
FIG. 1 is a block diagram of an arc welding system including an example welding-type power supply configured to communicate via a welding arc, in accordance with aspects of this disclosure.

Disclosed example methods and apparatus play audio to a weld operator during welding by modulating audio through the welding arc. The audio may be modulated onto the welding arc at the power supply, at a wire feeder, and/or via a separate device.

Conventional methods of providing audio to an operator involves using a dynamic speaker, which has limitations in a welding environment. For example, the cost of the speaker, difficulty with placement of the speaker, and/or controlling the appropriate sound level of the speaker are typical issues involved with providing audio feedback in a welding environment with a speaker. Disclosed examples provide an audible voice near the operator, with an appropriate sound level, and without necessarily requiring extraneous devices in the welding system to produce the audio.

Disclosed examples leverage the arc that is already present in an arc welding, gouging, and/or cutting operation to provide audio feedback. Such arcing operations produce a plasma column between the electrode and work. Disclosed examples modulate an audio signal onto the current producing the plasma column to create an audible voice. For example, amplitude modulation is used to generate sound with the arc or plasma column.

Some disclosed examples provide audio feedback to the operator via playing one or more selected audio messages using the arc as a plasma speaker. Example operator feedback may include operational information such as weld voltage, weld current, wire feed speed, weld sequence, heat input, remaining duty cycle, and/or arc quality metrics. Other example information includes training feedback such as travel speed, contact tip to work distance, travel angle, and/or work angle.

Disclosed example audio feedback includes a voice or tones. For example, a voice may state verbal information to the operator reflective of an instruction (e.g., move faster, move slower) or information (e.g., heat input exceeding limit). Instead of an audible voice, different sounds and tones may be used. For example, tones or sounds that are associated with known concepts, such as chimes, chirps, alarms, sirens, and/or other alerts. The tones or sounds may be associated with an event or pending event, such as a thermal shutdown event. Additionally or alternatively, the welding system could loop a continuous tone or sound clip when the weld is considered acceptable (or unacceptable), and generate a different tone or no tone when the weld is unacceptable (or acceptable). The continuous tone may be a signature sound, or a sound that uniquely identifies the type or brand of the power supply 102 to the listener, such as when the monitored aspects of the weld meet a quality threshold or standard.

As used herein, the term "welding-type arc" refers to a plasma arc of the type produced during arc welding, arc gouging, and/or plasma cutting operations. As used herein, the term "welding-type power supply" refers to a power supply that can provide power suitable for welding, plasma cutting, and/or arc gouging.

Disclosed example welding-type power supplies include a power converter, a weld monitor, and an arc modulator. The power converter outputs welding power to sustain a welding-type arc at a welding-type torch. The weld monitor monitors one or more aspects of a weld being performed using the welding-type arc and the welding-type torch, and selects an audio message based on the one or more aspects. The arc modulator modifies the welding-type arc to output the selected audio message as a plasma speaker.

In some examples, the arc modulator modulates an audio signal onto the welding power to cause the welding-type arc to output the audio signal as sound, and the audio signal is representative of the selected audio message. Some example welding-type power supplies further include a storage device to store the audio message. In some such examples, the storage device stores the audio message as digital audio data, and the arc modulator converts the digital audio data to an audio signal and modifies the welding-type arc to output the audio message. Some such examples further include a control circuit, where the storage device stores a plurality of audio files including the audio message, and the control circuit selects one of the plurality of audio files to be output as audio by the arc modulator based on receiving feedback information.

Some examples further include a digital-to-analog converter to convert the audio message to an analog audio signal, where the arc modulator modifies the welding-type arc to output the audio message based on the analog audio signal. In some examples, the arc modulator includes a resampler to convert the audio message from a first sampling rate to a second sampling rate corresponding to a control frequency of the power converter, where the arc modulator modifies the welding-type arc using the audio message at the second sampling rate.

In some examples, the weld monitor receives information from a sensor, in which the weld monitor determines the one or more aspects of the weld based on the information from the sensor. In some examples, the weld monitor determines the audio message based on at least one of: a torch angle of the welding-type torch, a travel speed of the welding-type torch, a weld voltage, a weld current, heat input, an error condition, a welding-type gas pressure, an identified acceptable welding-type condition, an identified unacceptable welding-type condition, a temperature of the welding-type power supply, or a duty of the welding-type power supply. In some examples, the arc modulator modifies the welding-type arc by amplitude modulation of an audio signal on to the welding power.

Some example welding-type power supplies further include a communications interface to receive audio information from an external device, in which the arc modulator modifies the welding-type arc to output the audio message based on the audio information from the external device. Some such examples further include an amplifier configured to condition the audio information from the external device based on a welding-type variable. Some examples further include a volume control device, in which the arc modulator modifies the welding-type arc to output the audio message based on an input from the volume control device.

Disclosed example welding-type devices include a welding-type circuit coupler to couple the welding-type device to a welding-type circuit that is configured to conduct welding-type current for sustaining a welding-type arc at a welding torch, and an arc modulator to modulate an audio signal onto the welding-type current to output audio using the welding-type arc as a plasma speaker.

Some example welding-type devices further include a storage device configured to store audio information, in which the arc modulator modifies the welding-type arc to output the audio based on the audio information. In some examples, the storage device stores the audio information as digital audio data, in which the arc modulator transcodes the digital audio data to the audio signal and to modify the welding-type arc to output the audio based on the audio signal.

In some examples, the welding-type device is at least one of a wire feeder, a remote control pendant, or a weld current audio injector. In some examples, the welding-type circuit coupler includes at least one of: a weld cable tap configured to couple to a weld cable or a work cable by piercing a sheathing of the weld cable or the work cable or a weld cable connector configured to receive the weld cable. Some examples further include a communications interface to receive audio information from an external device, in which the arc modulator modifies the welding-type arc to output the audio based on the audio information from the external device. In some examples, the welding-type circuit coupler includes at least one of a current transformer to magnetically couple the arc modulator to the welding-type circuit, or first and second welding-type circuit connectors to physically couple the arc modulator to the welding-type circuit.

FIG. 1 is a block diagram of an arc welding system 100 including an example welding-type power supply 102 configured to communicate via a welding-type arc 104. As described in more detail below, the example welding-type power supply 102 includes a weld monitor 106 and an arc modulator 108 to monitor a weld and to provide audible feedback via the welding arc 104 based on the monitoring.

The example power supply 102 powers, controls, and supplies consumables to a welding application. In some examples, the power supply 102 directly supplies input power to a welding-type torch 134. In the illustrated example, the power supply 102 is configured to supply power to welding operations and/or preheating operations. The example power supply 102 may also provide power to a wire feeder to supply an electrode wire to the welding-type torch 134 for various welding applications (e.g., gas metal arc welding (GMAW), flux-cored arc welding (FCAW)).

The power supply 102 includes a power converter 110, which may include transformers, rectifiers, switches, and so forth, capable of converting the AC and/or DC input power to AC and/or DC output power as dictated by the demands of the system (e.g., particular welding processes and regimes). The power converter 110 converts input power to welding-type power based on a weld voltage setpoint and outputs the welding-type power via a weld circuit.

In some examples, the power converter 110 is configured to convert the input power to both welding-type power and auxiliary power outputs. However, in other examples, the power converter 110 is adapted to convert input power only to a weld power output, and a separate auxiliary converter is provided to convert input power to auxiliary power. In some other examples, the power supply 102 receives a converted auxiliary power output directly from a wall outlet. Any suitable power conversion system or mechanism may be employed by the power supply 102 to generate and supply both weld and auxiliary power.

The power supply 102 includes a controller 112 to control the operation of the power supply 102. The power supply 102 also includes a user interface 114. The controller 112 receives input from the user interface 114, through which a user may choose a process and/or input desired parameters (e.g., voltage, current, particular pulsed or non-pulsed welding processes, and so forth). The user interface 114 may receive inputs using any input device, such as via a keypad, keyboard, buttons, touch screen, voice activation system, wireless device, etc. Furthermore, the controller 112 controls operating parameters based on input by the user as well as based on other operating parameters. Specifically, the user interface 114 may include a display 116 for presenting, showing, or indicating, information to an operator. The controller 112 may also include interface circuitry for communicating data to other devices in the system, such as a wire feeder. For example, in some situations, the power supply 102 wirelessly communicates with other welding devices within the welding system. Further, in some situations, the power supply 102 communicates with other welding devices using a wired connection, such as by using a network interface controller (NIC) to communicate data via a network (e.g., ETHERNET, 10baseT, 10base100, etc.).

The controller 112 includes at least one controller or processor 120 that controls the operations of the welding power supply 102. The controller 112 receives and processes multiple inputs associated with the performance and demands of the system. The processor 120 may include one or more microprocessors, such as one or more "general-purpose" microprocessors, one or more special-purpose microprocessors and/or ASICS, and/or any other type of processing device. For example, the processor 120 may include one or more digital signal processors (DSPs).

The example controller 112 includes one or more storage device(s) 123 and one or more memory device(s) 124. The storage device(s) 123 (e.g., nonvolatile storage) may include ROM, flash memory, a hard drive, and/or any other suitable optical, magnetic, and/or solid-state storage medium, and/or a combination thereof. The storage device 123 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 124 may include a volatile memory, such as random-access memory (RAM), and/or a nonvolatile memory, such as read-only memory (ROM). The memory device 124 and/or the storage device(s) 123 may store a variety of information and may be used for various purposes. For example, the memory device 124 and/or the storage device(s) 123 may store processor executable instructions 125 (e.g., firmware or software) for the processor 120 to execute. In addition, one or more control regimes for various welding processes, along with associated settings and parameters, may be stored in the storage device 123 and/or memory device 124, along with code configured to provide a specific output (e.g., initiate wire feed, enable gas flow, capture welding current data, detect short circuit parameters, determine amount of spatter) during operation.

The power supply 102 receives primary power 126 (e.g., from the AC power grid, an engine/generator set, a battery, or other energy generating or storage devices, or a combination thereof) as the input power, conditions the primary power 126, and provides an output power to one or more welding devices and/or preheating devices in accordance with demands of the system. The primary power 126 may be supplied from an offsite location (e.g., the primary power 126 may originate from the power grid).

In some examples, the welding power flows from the power converter 110 through a weld cable 132 to a welding-type torch 134. A work cable 136 is coupled between a workpiece 138 and the power supply 102 (e.g., to the power converter 110). The example weld cable 132 is attachable and detachable from weld studs at each of the power supply 102 (e.g., to enable ease of replacement of the weld cable 132 in case of wear or damage). In some examples, the power supply 102 includes or is implemented in a wire feeder.

In some examples, a gas supply 128 provides shielding gases, such as argon, helium, carbon dioxide, and so forth, depending upon the welding application. The shielding gas flows to a valve 130, which controls the flow of gas, and if desired, may be selected to allow for modulating or regulating the amount of gas supplied to a welding application. The valve 130 may be opened, closed, or otherwise operated by the controller 112 to enable, inhibit, or control gas flow (e.g., shielding gas) through the valve 130. Shielding gas exits the valve 130 and flows through a cable 132 (which in some implementations may be packaged with the welding power output) to the wire feeder which provides the shielding gas to the welding application. In some examples, the power supply 102 does not include the gas supply 128, the valve 130, the weld cable 132, and/or the work cable 136.

The weld monitor 106 may be implemented and/or executed by the controller 112 and/or the processor 120 (e.g., executing the instructions 125 stored in the memory 124 and/or the storage device(s) 123). The weld monitor 106 monitors one or more aspects of a weld performed using the welding-type arc and the welding-type torch 134.

Based on the one or more aspects of the weld, the weld monitor 106 selects one or more audio message(s) 140. The example audio message(s) 140 may be stored in the memory 124 and/or the storage device(s) 123 as audio files in any compressed and/or uncompressed audio format(s), including .WAV, .MP3 or its progeny, and/or any other format. The example controller 112 (e.g., implementing the weld monitor 106) selects one or more of the plurality of the stored audio files to be output as audio by the arc modulator 108, based on receiving feedback information.

The arc modulator 108 is coupled to the output of the power converter 110 (e.g., to the weld cable 132 and the work cable 136) and modifies the welding-type arc to output the selected audio message as a plasma speaker. As used herein, a plasma speaker refers to a loudspeaker which creates sound by varying air pressure via a high-energy electrical plasma (instead of a solid diaphragm). In some examples, the arc modulator 108 modulates an audio signal onto the welding power to cause the welding-type arc 104 to output the audio signal as sound. For example, the arc modulator 108 uses amplitude modulation to modulate the current on the weld circuit, which modulates the current in the arc 104. As illustrated in FIG. 1, the arc modulator 108 may modulate the current by adjusting a current command determined by the controller 112 executing a voltage-controlled or current-controlled control loop to control an output current or output voltage from the power converter 110. By adjusting the current command, the arc modulator 108 may be implemented in software by the controller 112 without additional electrical connections between the controller 112 and the power converter 110. As the amplitude of the current through the plasma column of the arc 104 is varied, the plasma changes the air pressure around the plasma column. The changes in air pressure create sound pressure waves that result in audible sound.

The arc modulator 108 may scale the audio to adjust the sound level and/or to maintain an average signal level of substantially zero. The arc modulator 108 adds the scaled array to the welding arc current to cause the audio to play via the arc 104. By adjusting the audio to maintain an average signal level of substantially zero, the average welding current remains substantially the same as when the arc modulator 108 is not outputting the audio via the arc 104.

The arc modulator 108 may include, for example, one or more codecs to process stored audio message(s) 140 and/or a digital-to-analog converter (DAC) 142 to convert the audio message(s) 140 from digital format to the analog form for modulation onto the welding power.

Additionally or alternatively, the arc modulator 108 may include a resampler 144 to convert the audio information from a first sampling rate (e.g., a sampling rate of the selected audio file) to a second sampling rate that corresponds to a control frequency of the power converter 110. The arc modulator 108 modifies the arc 104 (e.g., modulates the audio signal onto the welding circuit) using the audio information at the second sampling rate. In some examples, the controller 112 modifies a pitch of the audio message(s) 140 to create a more "normal" pitch (e.g., to more closely represent how the audio message would sound via conventional speakers) prior to providing the audio message(s) 140 to the arc modulator 108.

The weld monitor 106 may receive information from one or more sensor(s) 146 and determine one or more aspects of the weld, and/or select the one or more audio message(s) 140, based on the information received from the sensor(s)

146. Example sensors that may be used include image sensors or cameras (e.g., a single image sensor, visible spectrum sensors, infrared spectrum sensors, stereoscopic sensors, high dynamic resolution image sensors, etc.), laser scanners, voltage sensors, current sensors, temperature sensors, wire speed sensors, position, orientation and/or motion sensors (e.g., accelerometers, gyroscopes, etc.), The sensor(s) 146 may include inertial measurement units (IMUs) such as multi-axis gyroscopes, multi-axis accelerometers, and/or multi-axis magnetometers to detect, encode, and/or measure movement of the helmet (e.g., turning, vibration, traveling and shaking of the helmet as the wearer's head moves to follow the arc).

Image sensors may be used in conjunction with markers printed on stickers or pre-etched on the workpiece 138 and/or the welding-type torch 134 to track gun position, orientation and motion relative to the seam. The sensor(s) 146 may provide to the controller 112 information such as gun travel speed, gun orientation relative to the joint (i.e. torch angle and travel angle) and wire placement relative to the center of the joint can be extracted from image processing.

Based on the information from the sensor(s) 146, the power converter 110, and/or any other source of weld information, the example weld monitor 106 may determine, and select the audio message(s) 140 based on, a torch angle of the welding-type torch 134, a travel speed of the welding-type torch 134, a weld voltage, a weld current, heat input, an error condition, a welding-type gas pressure, an identified acceptable welding-type condition, an identified unacceptable welding-type condition, a temperature of the welding-type power supply, a duty of the welding-type power supply, and/or any other welding-related information. Additionally or alternatively, the controller 112 may include one or more counters to monitor and count welding activities, and select a message for playback based on the status of the counter(s). For example, the counter(s) may count weld activities such as a number of welds performed (e.g., tack welds, completed welds, etc.), a number of parts welded per hour, a quantity of welding consumable used, or any other trackable data. If a welder intends to make 10 tack welds during a part fitting, the counter(s) may count the number of tack welds performed. If the counted number played back during the "final" weld is not equal to the number expected by the welder, the welder knows to review the tack welds performed and to take corrective action.

The user interface 114 may include a communications interface 148, such as an audio jack or other digital data connector and/or audio connector, to receive audio information from, for example, a music player or other source of audio. The user interface 114 may provide audio received via the audio connector to the controller 112 and/or the arc modulator 108 for output via arc 104. The controller 112 and/or the arc modulator 108 may perform resampling, scaling, DAC, and/or any other appropriate operations for playing the received audio via the arc 104. The user interface 114 would permit an operator to listen to personal audio and/or personal alerts (e.g., from a smartphone or other computing device), and/or use any other audio source, via the welding arc 104. Examples of other external devices include a welding accessory, a workplace public address system, or a workplace alert/bell system.

The arc modulator 108 may include an amplifier 150 to condition the audio information from the external device via the communications interface 148 based on a welding-type variable and/or any other factor (e.g., a minimum volume level). Additionally or alternatively, the user interface 114 may include a volume control device 152 to enable a user to control a volume level of audio played via the arc 104. The arc modulator 108 receives volume information from the volume control device 152 and modifies the arc 104 to output the audio based on the input from the volume control device 152.

In some examples, the controller 112 provides welding process characteristics to the arc modulator 108, which processes the audio information based on the type of welding process. For example, in short circuit welding, the arc 104 is repeatedly temporarily extinguished and restarted. A typical shorting frequency is 100 Hz, where 25% of the time the weld process is in the short circuit state (i.e., no arc), and 75% of the time the weld process in the arc state. The controller 112 may provide the average shorting frequency and/or other short circuit data to enable the arc modulator 108 to improve the quality of the sound by taking the lack of arcing into account during processing.

Figure 2:
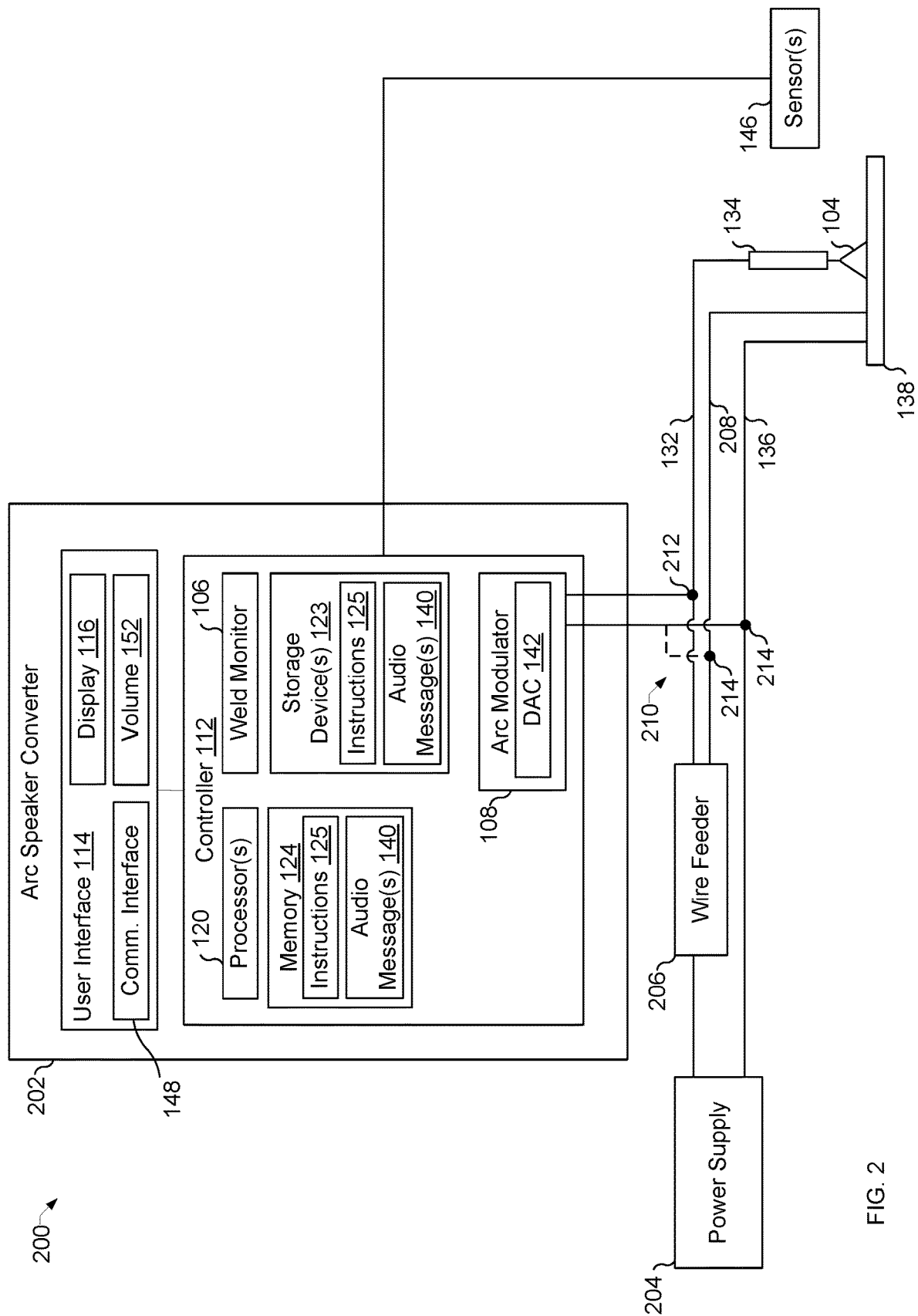
FIG. 2 is a block diagram of another arc welding system including an example arc speaker converter configured to communicate via a welding arc, in accordance with aspects of this disclosure.

FIG. 2 is a block diagram of another arc welding system 200 including an example arc speaker converter 202 configured to communicate via a welding arc. The system 200 of FIG. 2 includes a welding-type power supply 204 coupled to the welding-type torch 134 via the weld cable 132 and coupled to the workpiece 138 via the work cable 136. The example system 200 includes a wire feeder 206 coupled between the power supply 204 and the torch 134 via the weld cable 132. The wire feeder 206 also includes a voltage sense lead 208 to couple the wire feeder 206 to the workpiece 138.

The system 200 also includes an arc speaker converter 202 coupled to the weld cable 132 and to at least one of the work cable 136 or the voltage sense lead 208 to enable the arc speaker converter 202 to modulate a signal across the arc 104. The arc speaker converter 202 includes the example weld monitor 106 and the example arc modulator 108 described above. A welding-type circuit coupler 210 couples the arc speaker converter 202 to the welding-type circuit. An example welding-type circuit coupler 210 includes first and second welding-type circuit connectors 212, 214 to physically couple the arc speaker converter 202 to the welding circuit. The connectors 212, 214 couple the arc speaker converter 202 to the weld cable 132 and to at least one of the work cable 136 or the voltage sense lead 208 to enable the arc speaker converter 202 to modulate a signal across the arc 104.

In some other examples, the welding-type circuit coupler 210 couples the arc speaker converter 202 to the weld cable 132 and/or the work cable 136 via a current transformer. Use of the current transformer instead of physical connections enables electrical isolation between the arc speaker converter 202 (and any circuitry and/or devices connected to the arc speaker converter 202) and the weld circuit. By using a current transformer, the arc speaker converter 202 may also be more easily connected to the weld circuit than using physical connections. Any other welding-type circuit coupler may be used to couple the arc speaker converter 202 to the welding-type circuit. For example, the arc modulator 108 may be electromagnetically coupled to the weld cable 132 or the work cable 136 by wrapping a coil around the weld cable 132 or the work cable 136.

The arc speaker converter 202 further includes the example controller 112, the user interface 114, the display 116, the processor (s) 120, the storage device(s) 123, the memory 124, the instructions 125, audio message(s) 140, the DAC 142, and/or the resampler 144 of FIG. 1. The arc speaker converter 202 may be used with existing welding equipment, such as the power supply 204 and/or the wire feeder 206 to provide communications via the arc 104 in a similar manner as described above.

The example arc speaker converter 202 may be implemented in the wire feeder 206, a remote control accessory, and/or a dedicated audio injection device.

Figure 3:
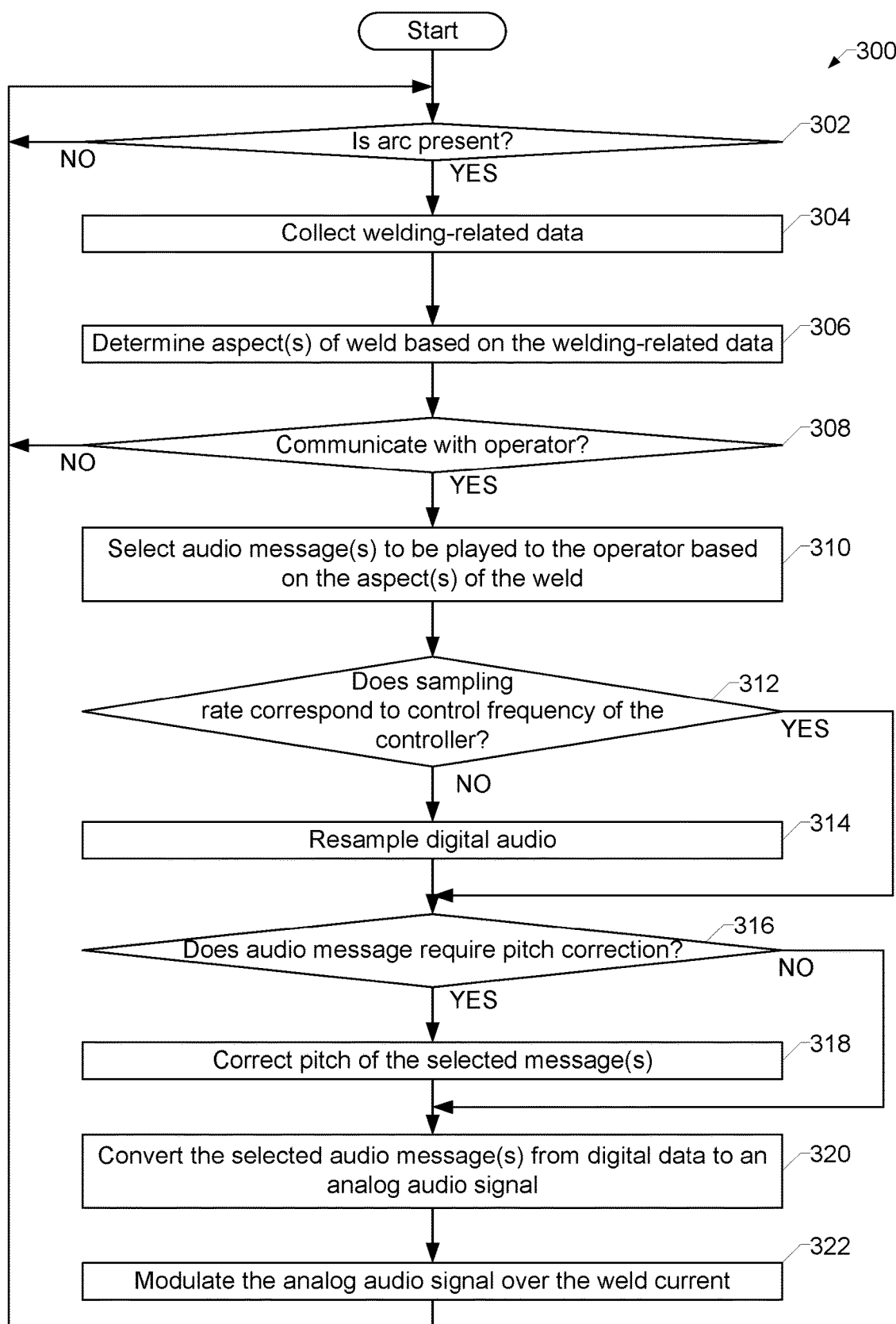
FIG. 3 is a flowchart representative of example machine-readable instructions which may be executed by disclosed example apparatus to communicate via a welding arc.

FIG. 3 is a flowchart representative of example machine-readable instructions 300 which may be executed by disclosed example power supply 102 of FIG. 1 and/or the arc speaker converter 202 of FIG. 2 to communicate via a welding arc. The example instructions 300 may be executed by a logic circuit, such as the processor 120 or the controller 112 of FIGS. 1 and/or 2, and/or stored in a machine-readable storage device such as the storage device(s) 123 and/or the memory 124 of FIGS. 1 and/or 2.

At block 302, the example weld monitor 106 determines whether the arc 104 is present (e.g., whether an arc welding operation is taking place). For example, the weld monitor 106 may determine that the arc is present based on receiving a signal from the sensor(s) 146 (e.g., a current sensor, a light sensor), based on a control state of the controller 112 controlling the output of the power converter 110, and/or any other input representative of the arc state. If the arc is not present (block 302), the weld monitor iterates block 302 to continue monitoring for the presence of the arc 104.

When the arc is present (block 302), at block 304 the weld monitor 106 collects welding-related data. For example, the welding-related data may be collected from the sensor(s) 146, the power converter 110, the controller 112, and/or any other source. At block 306, the weld monitor 106 determines one or more aspects of the weld based on the welding-related data. For example, the weld monitor 106 may determine the position and/or travel speed of the torch, weld parameters such as voltage and/or current, and/or any other measured and/or derived aspect(s) of the weld.

At block 308, the example weld monitor 106 determines whether a communication is to be provided to the operator. For example, the determined aspect(s) of the weld may cause the weld monitor to determine that the operator is to be instructed to slow down or speed up a torch travel speed, adjust a torch angle, adjust a weld current and/or voltage, and/or another informational and/or instructional message to the user. If a communication is not to be provided to the operator (block 308), control returns to block 302.

If a communication is to be provided to the operator (block 308), at block 310 the weld monitor 106 selects one or more audio messages to be played to the operator based on the aspect(s) of the weld.

At block 312, the arc modulator determines (e.g., via the resampler 144) whether the sampling rate of the selected audio message(s) correspond to the control frequency of the controller 112. The control frequency may be the rate at which the controller 112 executes a control loop to update a weld current and/or voltage. If the sampling rate does not correspond to the control frequency (block 312), at block 314 the resampler 144 resamples the digital audio data in the selected audio message(s). In some examples, such as when the arc modulator 108 sources and sinks current independently of the controller 112, blocks 312 and 314 may be omitted.

After resampling (block 314), or if the sampling rate already corresponds to the control frequency, at block 316 the arc modulator 108 determines whether the audio message requires pitch correction. For example, playback of digital data may be distorted when using an arc as the playback medium. If the audio message has not been previously pitch corrected and the arc characteristics require that the pitch be corrected to increase the clarity of the message, the arc modulator 108 may perform the pitch correction. If the audio message requires pitch correction (block 316), at block 318 the example arc modulator 108 corrects the pitch of the selected message(s).

After correcting the pitch (block 318), or if pitch correction is not required (block 316), at block 322, the arc modulator 108 converts (e.g., via the DAC 142) the selected audio message(s) from the digital data (e.g., resampled, pitch corrected, and/or otherwise modified as appropriate) to an analog audio signal. At block 322, the arc modulator 108 modulates the analog audio signal over the weld current. The modulation results in playback of the audio through the welding-type arc 104.

After modulating the analog audio signal (block 322), control returns to block 302.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application-specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine-readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or." As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y and z." . . . As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power supply, comprising:
a power converter configured to output welding power to sustain a welding-type arc at a welding-type torch;
a weld monitor circuit configured to:
monitor one or more aspects of a weld being performed using the welding-type arc and the welding-type torch; and
select an audio message based on the one or more aspects; and
a volume control device configured to receive user input for controlling volume level of audio; and
an arc modulator configured to modify the welding-type arc to output the selected audio message as a plasma speaker, wherein the arc modulator is configured to modify the welding-type arc to output the audio message based on an input from the volume control device.

2. The welding-type power supply as defined in claim 1, wherein the arc modulator is configured to modulate an audio signal onto the welding power to cause the welding-type arc to output the audio signal as sound, the audio signal representative of the selected audio message.

3. The welding-type power supply as defined in claim 1, further comprising a storage device configured to store the audio message.

4. The welding-type power supply as defined in claim 3, further comprising a digital-to-analog converter to convert the audio message to an analog audio signal, the arc modulator configured to modify the welding-type arc to output the audio message based on the analog audio signal.

5. The welding-type power supply as defined in claim 3, wherein the arc modulator comprises a resampler to convert the audio message from a first sampling rate to a second sampling rate corresponding to a control frequency of the power converter, the arc modulator configured to modify the welding-type arc using the audio message at the second sampling rate.

6. The welding-type power supply as defined in claim 1, wherein the weld monitor circuit is configured to receive information from a sensor, the weld monitor circuit configured to determine the one or more aspects of the weld based on the information from the sensor.

7. The welding-type power supply as defined in claim 1, wherein the weld monitor circuit is configured to determine the audio message based on at least one of: a torch angle of the welding-type torch, a travel speed of the welding-type torch, a weld voltage, a weld current, heat input, an error condition, a welding-type gas pressure, an identified acceptable welding-type condition, an identified unacceptable welding-type condition, a temperature of the welding-type power supply, or a duty of the welding-type power supply.

8. The welding-type power supply as defined in claim 1, wherein the arc modulator is configured to modify the welding-type arc by amplitude modulation of an audio signal on to the welding power.

9. A welding-type device, comprising:
a welding-type circuit coupler configured to couple the welding-type device to a welding-type circuit that is configured to conduct welding-type current for sustaining a welding-type arc at a welding torch; and
an arc modulator configured to modulate an audio signal onto the welding-type current to output audio using the welding-type arc as a plasma speaker;
wherein the welding-type circuit coupler comprises at least one of: a weld cable tap configured to couple to a weld cable or a work cable by piercing a sheathing of the weld cable or the work cable or a weld cable connector configured to receive the weld cable.

10. The welding-type device as defined in claim 9, further comprising a storage device configured to store audio information, the arc modulator configured to modify the welding-type arc to output the audio based on the audio information.

11. The welding-type device as defined in claim 10, wherein the storage device is configured to store the audio information as digital audio data, the arc modulator configured to transcode the digital audio data to the audio signal and to modify the welding-type arc to output the audio based on the audio signal.

12. The welding-type device as defined in claim 9, wherein the welding-type device is at least one of a wire feeder, a remote control pendant, or a weld current audio injector.

13. The welding-type device as defined in claim 9, further comprising a communications interface configured to receive audio information from an external device, the arc modulator configured to modify the welding-type arc to output the audio based on the audio information from the external device.

14. A welding-type device, comprising:
a welding-type circuit coupler configured to couple the welding-type device to a welding-type circuit that is configured to conduct welding-type current for sustaining a welding-type arc at a welding torch;
an arc modulator configured to modulate an audio signal onto the welding-type current to output audio using the welding-type arc as a plasma speaker; and
a communications interface configured to receive audio information from an external device, the arc modulator configured to modify the welding-type arc to output the audio based on the audio information from the external device.

15. The welding-type device as defined in claim 14, further comprising a storage device configured to store audio information, the arc modulator configured to modify the welding-type arc to output the audio based on the audio information.

16. The welding-type device as defined in claim 15, wherein the storage device is configured to store the audio information as digital audio data, the arc modulator configured to transcode the digital audio data to the audio signal and to modify the welding-type arc to output the audio based on the audio signal.

17. The welding-type device as defined in claim 14, wherein the welding-type device is at least one of a wire feeder, a remote control pendant, or a weld current audio injector.

* * * * *